United States Patent [19]

Porta

[11] Patent Number: 4,980,135
[45] Date of Patent: Dec. 25, 1990

[54] PROCESS FOR SEPARATING BARIUM FROM WATER-SOLUBLE STRONTIUM SALTS

[75] Inventor: Jacopo Porta, Querceta, Italy

[73] Assignee: Kali-Chemie AG, Hanover, Fed. Rep. of Germany

[21] Appl. No.: 454,200

[22] Filed: Dec. 21, 1989

[30] Foreign Application Priority Data

Jan. 13, 1989 [DE] Fed. Rep. of Germany ....... 3900878

[51] Int. Cl.$^5$ .............................................. C01F 11/46
[52] U.S. Cl. ...................................... 423/166; 423/554
[58] Field of Search ................................ 423/166, 554

[56] References Cited

U.S. PATENT DOCUMENTS

| 2,161,650 | 6/1939 | Work et al. | 423/166 |
| 3,029,133 | 4/1962 | Goodenough | 23/66 |
| 4,110,402 | 8/1978 | Bauman et al. | 423/166 |
| 4,842,833 | 6/1989 | Jäger | 423/166 |

FOREIGN PATENT DOCUMENTS

| 613840 | 1/1961 | Canada | 423/166 |
| 1816891 | 7/1970 | Fed. Rep. of Germany . | |
| 2618136 | 1/1989 | France . | |
| 12283 | 3/1971 | Japan | 423/166 |
| 209429 | 3/1968 | U.S.S.R. | 423/166 |
| 787370 | 12/1980 | U.S.S.R. | 423/166 |
| 1117284 | 10/1984 | U.S.S.R. | 423/166 |

OTHER PUBLICATIONS

*Handbook of Chemistry and Physics,* 55th Edition (1974), CRC Press, pp. B-71, B-79, B-143.
Evzhanov, Kh et al.: "Precipitation of Strontium and Calcium Sulfate from Highly Mineralized Waters", Chemical Abstracts, vol. 99, Ref. No. 55773D, 1983.
Baryshnikov, N. V. et al.: "Removal of Barium from Strontium-Containing Solutions", Chemical Abstracts, vol. 101, Ref. No. 232622M, 1984.
Barthe et al., "Preparation Des Sels, Bull. Soc. Chim. (3)", 7, pp. 104–108 (1892).

*Primary Examiner*—Wayne A. Langel
*Attorney, Agent, or Firm*—Foley & Lardner, Schwartz, Jeffery, Schwaab, Mack, Blumenthal & Evans

[57] ABSTRACT

A process is described for separating barium from barium-containing, water-soluble strontium salts by means of an alkali metal sulfate. The process can be carried out either batch-wise or continuously and enables readily controlled production of strontium salts which are especially low in barium content.

20 Claims, No Drawings

4,980,135

PROCESS FOR SEPARATING BARIUM FROM WATER-SOLUBLE STRONTIUM SALTS

FIELD OF THE INVENTION

This invention relates to a process for separating barium from water-soluble strontium salts.

BACKGROUND OF THE INVENTION

The most important mineral which is used as a raw material for the production of strontium compounds is celestite. It consists predominantly of strontium sulfate and is usually contaminated with barium compounds. Because strontium compounds are used in certain fields of technology, for example in the manufacture of color television picture tubes, in the production of ceramic permanent magnets and as an additive for toothpastes, it is frequently desirable to separate the naturally occurring barium content from strontium salts.

For a long time, there has been an intensive search for methods for separating barium from strontium compounds.

Precipitation by means of chromate was for a long time the only industrially usable method for separating barium from strontium salts. Chromate is toxic, however, and must therefore itself be removed from the resulting strontium salt by extensive purification operations.

Another industrially applicable method is disclosed in published German patent application DE-OS No. 1,816,891. In this published application, the separation of barium is effected by means of the compound $SrSO_4 \cdot 2H_2O$ which, if desired, is also produced in situ by addition of sulfuric acid. This type of separation is, however, not easy to control, since strontium sulfate dihydrate is formed only under very definite, narrowly limited reaction conditions.

The hitherto known processes for separating barium from water-soluble strontium compounds thus have the disadvantage of involving the introduction of toxic materials or of being not easily carried out industrially.

SUMMARY OF THE INVENTION

It is the object of the invention to provide an industrially applicable method for separating barium from strontium salts, which overcomes the disadvantages of the known processes.

This object is achieved by providing a process for separating barium from a water-soluble strontium salt comprising the steps of (a) precipitating a solid by adding an alkali metal sulfate to an aqueous solution of a barium-containing strontium salt having a pH value between about 1 and about 10;(b) separating the precipitated solid from the solution, and (c) isolating the strontium salt, which has been depleted of barium, from the solution.

DETAILED DESCRIPTION OF PREFERRED EMBODIMENT

The process according to the invention for separating barium from water-soluble strontium salts comprises the steps of (a) precipitating a solid by adding an alkali metal sulfate to an aqueous solution of a strontium salt, containing barium and having a pH value between about 1 and about 10, (b) separating the precipitated solid from the solution, and (c) isolating the strontium salt, which has been depleted of barium, from the solution.

Water-soluble strontium salts, the aqueous solution of which is used in the process according to the invention, are understood to mean those strontium salts, the solubility of which in water at ambient temperature is greater than about 10 g per 100 cm$^3$.

Organic strontium salts, for example the acetate, can be used. Preferably, inorganic strontium salts are used, for example strontium nitrate or a strontium halide other than the fluoride, for example $SrCl_2$ or $SrBr_2$. Particularly preferably, aqueous solutions of strontium chloride are used. The preparation of such solutions is known to those skilled in the art. For example, the corresponding salts, still containing barium compounds, or their hydrates can be dissolved in water.

The concentration of the strontium salt in the aqueous solution can vary within a wide range, for example between about 1% by weight up to the saturation concentration. Preferably, the concentration of the strontium salt is between about 5% by weight and about 80% of the saturation concentration, and particularly preferably between about 10% by weight and about 80% of the saturation concentration.

Within the scope of the present invention, alkali metal sulfate is understood to mean the sulfates and hydrogen sulfates of the ions of the first main group of the Periodic Table and of ammonium. Preferably, the sulfates are used, in particular potassium sulfate and/or sodium sulfate. Particularly preferably, sodium sulfate is used. These salts can be used in anhydrous form or in the form of the hydrates.

The alkali metal sulfate can be employed as a solid, as a suspension in water, or as an aqueous solution. The alkali metal sulfate is preferably used in the form of an aqueous solution. The solution concentration can vary within a wide range, for example from about 0.5% by weight and up to the saturation concentration. Preferably, an alkali metal sulfate solution is employed, the alkali metal sulfate content of which is between about 0.5 and about 15% by weight, particularly preferably between about 1 and 10% by weight.

The absolute quantity in which those skilled in the art will employ the alkali metal sulfate depends on the purity requirements to be met by the product. If, for example, less than about 100% of the quantity of alkali metal sulfate stoichiometrically required for completely separating the barium is added, the separating effect on the barium is relatively small. If a very large excess of alkali metal sulfate is added, for example more than 800% of the quantity stoichiometrically required for separating the barium, the process becomes uneconomical, since strontium is also precipitated together with the solid material which is intended to be separated, in addition to the undesired barium. Good results are obtained when between about 100 and about 800%, preferably between about 300 and about 600%, of the quantity of alkali metal sulfate stoichiometrically required for completely separating the barium is added.

For pH value adjustment, an acid or base of organic or inorganic nature can be used, depending on the original pH value of the aqueous solution of the strontium salt. If an acid is used, preferably the acid corresponding to the anion of the strontium salt is employed. A very suitable example of a base is an alkali metal hydroxide, for example sodium hydroxide, or an alkali metal hydroxide solution.

Preferably, however, basic strontium compounds are used such as, for example, strontium carbonate or strontium oxide, and particularly preferably strontium hydroxide or a hydrate thereof, such as the octahydrate, because no foreign ions are introduced when these compounds are used.

The acid or base can be added to an aqueous solution of the strontium salt and/or to the alkali metal sulfate. Very good results were obtained when the strontium salt solution was adjusted to a pH value of about 2 to 6. The pH range between about 2 and about 4 is particularly suitable. Hydrochloric acid is especially suitable for pH value adjustment, when strontium chloride solution is used. If, according to a preferred embodiment, an alkali metal sulfate solution is used in addition to the strontium salt solution, the alkali metal sulfate solution is advantageously adjusted to a pH value of from 2 to 6.

A strontium salt particularly low in barium, for example having a content of less than 0.01 g of barium per 100 g of strontium salt, is obtained when the alkali metal sulfate is added to the aqueous solution of the strontium salt in such a way that about 30 to about 600% of the quantity of alkali metal sulfate stoichiometrically required for completely separating the barium are added per hour, preferably from about 50 to about 400% of the stoichiometric quantity per hour.

The precipitated solid is separated from the solution in step (b). This can be effected by known methods, for example by filtration, decanting or centrifuging. The separation of the solid can be carried out immediately after the precipitation occurring in step (a). If desired, a post-reaction phase can be inserted after the precipitation in step (a) and before the separation of the precipitated solid in step (b). This can, for example, amount to up to 24 hours, for example about 2 to about 15 hours.

It is advantageous to stir the reaction mixture during the precipitation. This is not necessary during the post-reaction phase, if this is carried out.

Moreover, it can be advantageous to adjust the solution to an alkaline pH value, for example to a value from about 7.5 to about 9, before the solid is separated. This can be effected by means of known inorganic bases, for example alkali metal hydroxide or alkali metal hydroxide solution. However, basic strontium compounds are particularly suitable, for example strontium carbonate, strontium oxide and/or strontium hydroxide or strontium hydroxide hydrates. Strontium hydroxide is especially suitable. The basic strontium compound can be added in a solid, suspended or dissolved state to the solution. This adjustment of the pH value to the alkaline region, in particular by means of strontium hydroxide, has the advantages that the solid precipitated in step (a) can be filtered off even more rapidly and that, in addition, if the aqueous solution of the barium-containing strontium salt was also contaminated with compounds of iron or aluminum, these can likewise be separated.

This embodiment thus makes it possible to separate barium as well as iron and/or aluminum from the water-soluble strontium salts.

A strontium salt, which has been depleted of barium, can then be isolated from the filtrate obtained in step (b). This can be effected, for example, by physical methods, for example by evaporative crystallization, or by chemical reactions, known to persons skilled in the art, which form poorly soluble strontium salts.

The process according to the invention can be carried out not only batch-wise, but also in a continuous or semicontinuous procedure. This embodiment of the process according to the invention comprises feeding the aqueous, barium-containing solution of a strontium salt and the alkali metal sulfate in a semicontinuous or continuous procedure to the solution obtained in step a) and containing a solid, and discharging a quantity of reaction mixture corresponding to the quantity fed.

This separation can, for example, be accomplished by means of an overflow.

The strontium salts, low in barium, obtained by the process according to the invention can be used as such, for example strontium chloride as an additive for medical toothpastes.

The strontium salts obtained, low in barium, are also valuable materials for use in the manufacture of picture screens for color television tubes, in catalyst production, and in the production of ceramic permanent magnets.

It is an advantage that the process according to the invention can be carried out without the use of heat energy, since it can be carried out at ambient temperature. A further advantage is that very pure products are obtained without the necessity of introducing toxic compounds into the process. Moreover, the process is easily controllable and therefore well suited for industrial application.

The following example is intended to illustrate the invention in further detail, without restricting its scope.

EXAMPLE

A barium-containing strontium chloride, which contained 0.5 g of barium per 100 g of strontium chloride, was dissolved in water until 12,570 liters of solution were obtained. The concentration of strontium chloride in this solution was about 230 g/l of strontium chloride. This aqueous strontium chloride solution was adjusted with hydrochloric acid to a pH value of between about 2 and 3.

1,000 l of a sodium sulfate solution containing 7.5% by weight of $Na_2SO_4$, the pH value of which had been adjusted to about 4.5, were then introduced with stirring into the acidified strontium chloride solution. The rate of addition was controlled in such a way that about 150 l of this sulfate solution were added per hour. The precipitation took place at ambient temperature, that is to say about 20° C.

After the addition of sodium sulfate solution was completed, the mixture was allowed to stand overnight, a sufficient quantity of strontium hydroxide was added to adjust the pH value to the range from about 8 to about 8.5, and the precipitated solid was thereafter filtered out. The filtrate was then evaporated, and the resulting solid obtained from the filtrate after evaporation was analyzed and found to contain only 0.003 g of barium per 100 g of strontium chloride.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all subject matter within the ambit of the appended claims and equivalents thereof.

What is claimed is:

1. A process for separating barium from barium-containing water-soluble strontium salts, comprising the steps of:
   (a) precipitating a solid by adding an alkali metal sulfate to an aqueous solution of a barium-containing strontium salt having a pH value between about 1 and about 10,
   (b) separating the precipitated solid from the solution, and
   (c) isolating the strontium salt, which has been depleted of barium, from the solution.

2. A process as claimed in claim 1, wherein the alkali metal sulfate is added in the form of an aqueous solution.

3. A process as claimed in claim 1, wherein the precipitation is carried out at a pH value of the solution between about 2 and about 6.

4. A process as claimed in claim 1, wherein the aqueous solution contains the strontium salt in a concentration from about 1% by weight up to the saturation concentration.

5. A process as claimed in claim 4, wherein said aqueous solution contains the strontium salt in a concentration between about 5% by weight up to about 80% of the saturation concentration.

6. A process as claimed in claim 1, wherein said strontium salt is a strontium halide.

7. A process as claimed in claim 6, wherein said strontium salt is strontium chloride.

8. A process as claimed in claim 2, wherein said aqueous alkali metal sulfate solution contains the alkali metal sulfate in a concentration of from about 0.5 to about 15% by weight.

9. A process as claimed in claim 8, wherein said aqueous alkali metal sulfate solution contains the alkali metal sulfate in a concentration of from about 1 to about 10% by weight.

10. A process as claimed in claim 1, wherein said alkali metal sulfate is used in a quantity which corresponds to between about 100% and about 800% of the quantity stoichiometrically required for completely separating the barium.

11. A process as claimed in claim 10, wherein said alkali metal sulfate is used in a quantity which corresponds to between about 300 and about 600% of the quantity stoichiometrically required for completely separating the barium.

12. A process as claimed in claim 1, wherein said alkali metal sulfate is added to the aqueous solution of the strontium salt in such a way that from about 30 to about 600% of the quantity of alkali metal sulfate stoichiometrically required to completely separate the barium are added per hour.

13. A process as claimed in claim 12, wherein said alkali metal sulfate is added to the aqueous solution of the strontium salt in such a way that from about 50 to about 400% of the quantity of alkali metal sulfate stoichiometrically required to completely separate the barium are added per hour.

14. A process as claimed in claim 1, wherein said alkali metal sulfate is sodium sulfate.

15. A process as claimed in claim 1, wherein said precipitated solid from step (a) is subjected to a post-reaction phase prior to separating said solid from said solution in step (b).

16. A process as claimed in claim 1, wherein said solution obtained in step (a) is adjusted to an alkaline pH value, prior to separating said solid from said solution in step (b).

17. A process as claimed in claim 16, wherein said solution is adjusted to a pH value in the range from 7.5 to 9 prior to separating said solid from said solution in step (b).

18. A process as claimed in claim 16, wherein a basic strontium salt is used to adjust the pH value.

19. A process as claimed in claim 18, wherein said basic strontium salt is strontium hydroxide.

20. A process as claimed in claim 1, wherein an aqueous solution of barium-containing strontium salt and alkali metal sulfate is fed continuously to the solid precipitate-containing solution obtained in step (a), and a quantity of reaction mixture corresponding to the quantity of solution fed in step (a) is continuously discharged.

* * * * *